United States Patent
Kaneko et al.

(10) Patent No.: US 9,064,297 B2
(45) Date of Patent: Jun. 23, 2015

(54) IMAGE INSPECTION APPARATUS, IMAGE INSPECTION SYSTEM AND IMAGE INSPECTION METHOD

(71) Applicants: Hitomi Kaneko, Saitama (JP); Tadashi Kitai, Kanagawa (JP)

(72) Inventors: Hitomi Kaneko, Saitama (JP); Tadashi Kitai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 105 days.

(21) Appl. No.: 14/018,496

(22) Filed: Sep. 5, 2013

(65) Prior Publication Data

US 2014/0079292 A1    Mar. 20, 2014

(30) Foreign Application Priority Data

Sep. 14, 2012 (JP) ................................ 2012-203590
Aug. 8, 2013 (JP) ................................ 2013-165590

(51) Int. Cl.
*G06T 7/00* (2006.01)
*H04N 1/00* (2006.01)

(52) U.S. Cl.
CPC .......... *G06T 7/0002* (2013.01); *H04N 1/00005* (2013.01); *H04N 1/00031* (2013.01); *H04N 1/00045* (2013.01); *H04N 1/00058* (2013.01); *H04N 1/00068* (2013.01)

(58) Field of Classification Search
USPC .............................................. 382/141–152
See application file for complete search history.

(56) References Cited

U.S. PATENT DOCUMENTS

| | | | | |
|---|---|---|---|---|
| 5,949,901 A | * | 9/1999 | Nichani et al. | 382/149 |
| 6,148,099 A | * | 11/2000 | Lee et al. | 382/149 |
| 7,388,979 B2 | * | 6/2008 | Sakai et al. | 382/149 |
| 2001/0033683 A1 | * | 10/2001 | Tanaka et al. | 382/149 |
| 2005/0043903 A1 | * | 2/2005 | Nara et al. | 702/35 |
| 2005/0179910 A1 | * | 8/2005 | Bartov | 356/503 |
| 2005/0232478 A1 | * | 10/2005 | Onishi et al. | 382/149 |

FOREIGN PATENT DOCUMENTS

JP    2008-003876    1/2008

* cited by examiner

*Primary Examiner* — Alex Liew
(74) *Attorney, Agent, or Firm* — Harness, Dickey & Pierce, P.L.C.

(57) ABSTRACT

An image inspection apparatus for inspecting a scanned image of an output image includes an inspection reference image generator to generate an inspection reference image; an image inspection unit to determine a defect by comparing a difference between the inspection reference image and the scanned image with a threshold; a threshold determiner to determine the threshold; and a defect range determiner to determine a range of defect level of a plurality of artificial defects. Based on a difference computed for a defect selected from the plurality of artificial defects, the threshold determiner determines a threshold to be compared with the difference of the selected defect. The defect range determiner conducts a defect determination for the scanned image at the upper and lower limits for a threshold to determine a range of defect level of the plurality of artificial defects.

8 Claims, 14 Drawing Sheets

FIG. 8

|  | ARRANGEMENT IN X DIRECTION | | | |
|---|---|---|---|---|
|  | 1 | 2 | 3 | 4 |
| 1 | PC+d$_1$, PM, PY, PK | PC, PM+d$_1$, PY, PK | PC, PM, PY+d$_1$, PK | PC, PM, PY, PK+d$_1$ |
| 2 | PC+d$_2$, PM, PY, PK | PC, PM+d$_2$, PY, PK | PC, PM, PY+d$_2$, PK | PC, PM, PY, PK+d$_2$ |
| 3 | PC+d$_3$, PM, PY, PK | PC, PM+d$_3$, PY, PK | PC, PM, PY+d$_3$, PK | PC, PM, PY, PK+d$_3$ |
| 4 | PC+d$_4$, PM, PY, PK | PC, PM+d$_4$, PY, PK | PC, PM, PY+d$_4$, PK | PC, PM, PY, PK+d$_4$ |
| 5 | PC+d$_5$, PM, PY, PK | PC, PM+d$_5$, PY, PK | PC, PM, PY+d$_5$, PK | PC, PM, PY, PK+d$_5$ |

ARRANGEMENT IN Y DIRECTION

FIG. 9

|  | ARRANGEMENT IN X DIRECTION | | | |
|---|---|---|---|---|
|  | 1 | 2 | 3 | 4 |
| 1 | th11 | th21 | th31 | th41 |
| 2 | th12 | th22 | th32 | th42 |
| 3 | th13 | th23 | th33 | th43 |
| 4 | th14 | th24 | th34 | th44 |
| 5 | th15 | th25 | th35 | th45 |

ARRANGEMENT IN Y DIRECTION

| MARK ID | COORDINATES | MARK POSITION | |
|---|---|---|---|
| 001 | $X_{001}, Y_{001}$ | X1Y1 | ... |
| 002 | $X_{002}, Y_{002}$ | X1Y2 | |
| ... | | | |

FIG. 14

| DEFECT ID | COORDINATES | DEFECT TYPE | DEFECT DETAIL | |
|---|---|---|---|---|
| 001 | $X_{001}, Y_{001}$ | STRIPE C | WIDTH 30 DOT | |
| 002 | $X_{002}, Y_{002}$ | STRIPE C | WIDTH 28 DOT | |
| ... | ... | ... | ... | |
| 011 | $X_{011}, Y_{011}$ | DOT | DIAMETER 100 DOT | ... |
| 012 | $X_{012}, Y_{012}$ | DOT | DIAMETER 90 DOT | |
| ... | ... | ... | ... | |
| 021 | $X_{021}, Y_{021}$ | DENSITY | $C_{21}, M_{21}, Y_{21}, K_{21}$ | |
| 022 | $X_{022}, Y_{022}$ | DENSITY | $C_{22}, M_{22}, Y_{22}, K_{22}$ | |
| | | ... | | |

FIG. 15
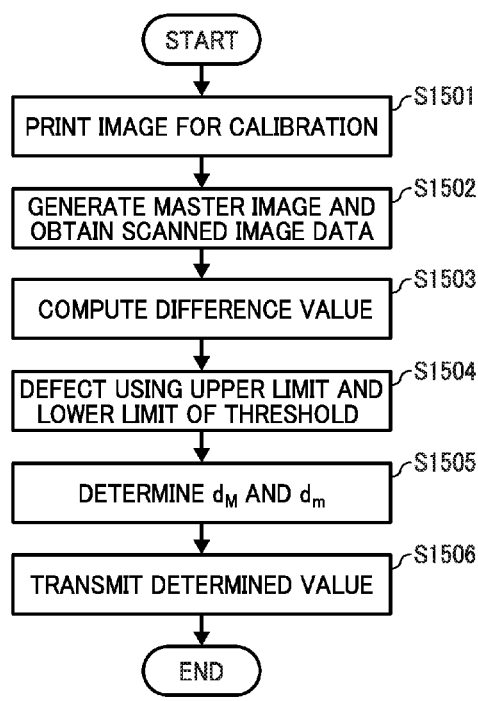
FIG. 16A DEFECT DETERMINATION WHEN THRESHOLD HAVING BROADEST ALLOWABLE RANGE IS USED
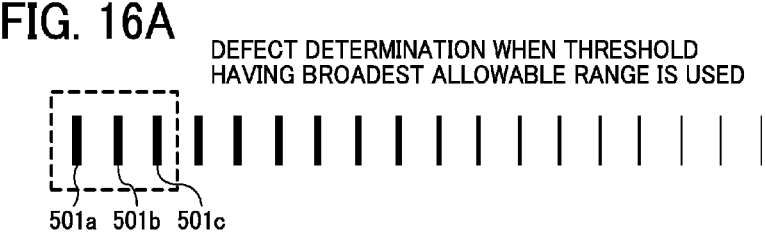
FIG. 16B DEFECT DETERMINATION WHEN THRESHOLD HAVING NARROWEST ALLOWABLE RANGE IS USED
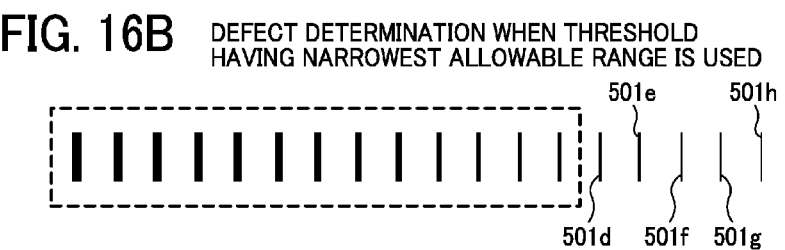

FIG. 17
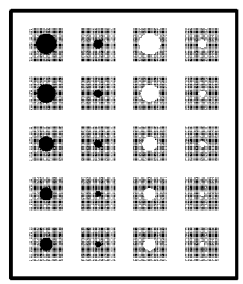
FIG. 18
| | |
|---|---|
| ☐ | X1 Y1 |
| ☐ | X1 Y2 |
| ☐ | X1 Y3 |
| ☐ | X1 Y4 |
| | . . . |
FIG. 19A
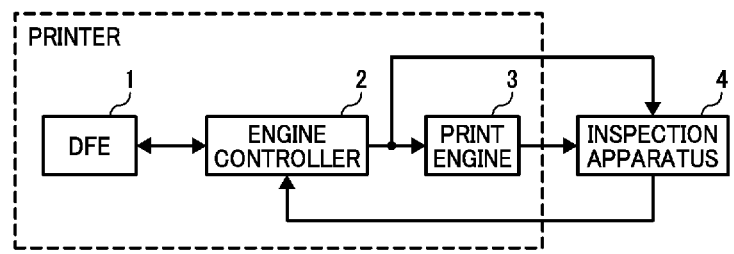
FIG. 19B
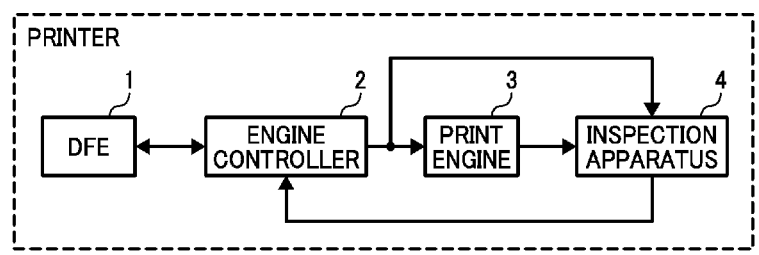

SCANNED IMAGE    MASTER IMAGE

IMAGE INSPECTION APPARATUS, IMAGE INSPECTION SYSTEM AND IMAGE INSPECTION METHOD

This application claims priority pursuant to 35 U.S.C. §119 to Japanese Patent Applications Nos. 2012-203590, filed on Sep. 14, 2012 and 2013-165590, filed on Aug. 8, 2013 in the Japan Patent Office, the disclosure of which is incorporated by reference herein in their entirety.

BACKGROUND

1. Technical Field

The present invention relates to an image inspection system and an image inspection method, and more particularly to setting of inspection thresholds used for determining defects in image.

2. Background Art

Conventional inspections of printed matter such as printed papers are conducted by visual inspection, but inspection apparatuses have been introduced to conduct the inspections as a post-processing operation of the offset printing. As for the inspection apparatus, the printed matters are visually inspected by an operator to select a printed matter having satisfactory image quality, and then the selected printed matter is scanned to generate a master image to be used as a reference image. The master image and inspection target printed matter are compared with each other by scanning the inspection target printed matter, and based on difference between the master image and the inspection target, defect of the inspection target printed matter can be determined.

However, the printing apparatuses of digital to press such as image forming apparatuses using electrophotography typically print images with a small volume, and also print different images for each page (i.e. variable printing), in which generating a master image from printed matter as a reference image is not efficient. In this type of image forming apparatuses, the master image can be generated from print data to efficiently conduct the inspection for the variable printing.

In this image inspection process, the defect of printed matter can be determined based on the above mentioned difference level. Specifically, scanned images prepared by scanning sheets printed with images and the master image generated from the print data are compared, in which positions and sizes of comparing images are matched and then the comparing images are compared for each pixel based on a given threshold.

JP-2008-003876-A discloses an image inspection process for an inkjet printer, which can verify inspection precision for the image inspection. Specifically, defects that may likely occur for the inkjet printer are artificially printed on sheets, the sheets having printed with the artificial defects are inspected, and then it is verified whether the inspection can be conducted effectively.

The above mentioned threshold used for comparing the images affect the inspection precision, therefore effective thresholds need to be set for high precision inspection. JP-2008-003876-A discloses a configuration to determine whether the inspection is conducted effectively using thresholds such as thresholds set in advance, in which suitable thresholds are not set automatically.

A plurality of defects having different levels can be reproduced as artificial defects to conduct an image inspection, and an image to be determined as defect can be selected by a user, and a threshold can be set based on a determination result of the defect image selected by the user. However, because image scanning capability of each apparatus is different, when generating the plurality of defects having different levels, the defect matched to the image scanning capability of apparatus is required to be generated and output. If the defect matched to the image scanning capability cannot be determined, preferable setting cannot be conducted.

SUMMARY

In one aspect of the present invention, an image inspection apparatus for inspecting an image output on a recording medium by scanning the output image as a scanned image is devised. The image inspection apparatus includes an inspection reference image generator to obtain data of an output-target image used by the image forming apparatus for an image forming operation, and to generate an inspection reference image using the data of the output-target image, the inspection reference image to be used for an image inspection of the scanned image; an image inspection unit to determine whether the scanned image includes a defect based on a comparison result obtained by comparing a difference between the inspection reference image and the scanned image with a given threshold; a threshold determiner to determine the given threshold based on a comparison result between the inspection reference image having a normal image condition and the scanned image of threshold setting image prepared by adding a plurality of artificial defects having different defect levels to the inspection reference image; and a defect range determiner to determine a range of defect level of a plurality of artificial defects having the different levels for the threshold setting image. The threshold determiner controls generation of the inspection reference image having the normal image condition to be used for determining the given threshold. The threshold determiner computes a difference between the inspection reference image and the scanned image of the threshold setting image for each of the plurality of artificial defects having the different defect levels. Based on a difference computed for a defect selected from the plurality of artificial defects having different defect levels, the threshold determiner determines a threshold to be compared with the difference of the selected defect to determine whether the scanned image includes a defect. The defect range determiner conducts a defect determination process for a range determination scanned image, obtained by scanning a range determination image displaying a plurality of defects having changed levels with a given interval at each of the upper limit and the lower limit settable for a threshold. The defect range determiner determines a range of defect level of the plurality of artificial defects having the different defect levels for the threshold setting image based on a defect level of a defect determined as defect in the defect determination process for the range determination image at each of the upper limit and the lower limit settable for the threshold.

In another aspect of the present invention, an image inspection system for inspecting an image output on a recording medium is devised. The image inspection system includes an image forming unit to conduct an image forming operation of a threshold setting image on the recording medium, the threshold setting image prepare-able by adding an artificial defect to an output-target image input to the image forming unit; an image scanner to scan the threshold setting image output on the recording medium to generate a scanned image; an inspection reference image generator to obtain data of the output-target image used by the image forming apparatus for an image forming operation, and to generate an inspection reference image using the data of the output-target image, the inspection reference image to be used for an image inspection of the scanned image; an image inspection unit to determine whether the scanned image includes a defect based on a comparison result obtained by comparing a difference between the inspection reference image and the scanned image with a given threshold; a threshold determiner to determine the given threshold based on a comparison result between the inspection reference image having a normal image condition and the scanned image of threshold setting image prepared by adding a plurality of artificial defects having different defect levels to the inspection reference image; and a defect range determiner to determine a range of defect level of a plurality of artificial defects having the different levels for the threshold setting image. The image forming section unit conducts an image forming operation of the threshold setting image based on the determined range of defect level of the artificial defect. The threshold determiner controls generation of the inspection reference image having the normal image condition to be used for determining the given threshold. The threshold determiner computes a difference between the inspection reference image and the scanned image of the threshold setting image for each of the plurality of artificial defects having the different defect levels. Based on a difference computed for a defect selected from the plurality of artificial defects having different defect levels, the threshold determiner determines a threshold to be compared with the difference of the selected defect to determine whether the scanned image includes a defect. The defect range determiner conducts a defect determination process for a range determination scanned image, obtained by scanning a range determination image displaying a plurality of defects having changed levels with a given interval at each of the upper limit and the lower limit settable for a threshold. The defect range determiner determines a range of defect level of the plurality of artificial defects having the different defect levels for the threshold setting image based on a defect level of a defect determined as defect in the defect determination process for the range determination image at each of the upper limit and the lower limit settable for the threshold.

In another aspect of the present invention, a method of inspecting an image, output on a recording medium, using an image inspection apparatus is devised. The method includes the steps of: obtaining an output-target image input to an image forming apparatus; generating an inspection reference image using data of the output-target image; forming a threshold setting image on the recording medium using the image forming apparatus, the threshold setting image prepare-able by adding an artificial defect to the inspection reference image; scanning the threshold setting image formed on the recording medium to obtain a scanned image of the threshold setting image; computing a difference between the scanned image and the inspection reference image by comparing the scanned image and the inspection reference image; determining a threshold, based on a difference computed for a defect selected from the plurality of artificial defects having different defect levels, the determined threshold to be compared with the difference for the selected defect to determine whether the scanned image includes a defect; conducting a defect determination process for a range determination scanned image obtained by scanning a range determination image, displaying a plurality of defects by changing levels of different types of defect with a given interval, at each of the upper limit and the lower limit settable for a threshold; and determining a range of defect level of the plurality of artificial defects having the different defect levels for the threshold setting image based on levels of defect determined as defect in the defect determination process for the range determination image at each of the upper limit and the lower limit settable for the threshold.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 shows an example of setting of artificial defects according to an example embodiment;

FIG. 9 shows an example of a computation result of discrete threshold computed for a plurality of artificial defects according to an example embodiment;

FIG. 14 shows an example of calibration-use information according to an example embodiment;

FIG. 15 is a flowchart of steps of a calibration process according to an example embodiment;

FIGS. 16A and 16B show examples of defect determination according to an example embodiment;

FIG. 17 shows examples of images output for threshold determination process according to another example embodiment;

FIG. 18 shows another example of threshold selection screen according to an example embodiment;

FIGS. 19A and 19B show schematic configurations of systems according to another example embodiment;

Figure 1:
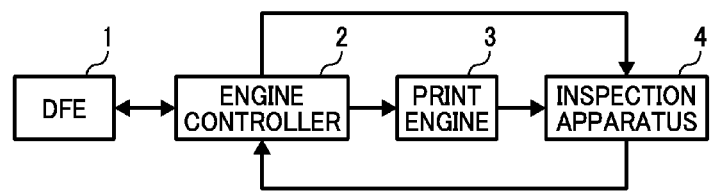
FIG. 1 shows a schematic configuration of an image forming system including an inspection apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited therefore because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter with reference to FIGS. 1 to 24.

In this disclosure, an image forming system includes an inspection apparatus, in which a master image and an scanned image obtained by scanning an image output by an image forming operation are compared to inspect an output (e.g., printed image) of the image forming operation, and based on the a comparison result, thresholds used to determine defect in an image, matched to inspection precision desired by a user, can be settable easily and preferably.

FIG. 1 shows an example configuration of an image forming system according to an example embodiment. As shown in FIG. 1, the image forming system includes, for example, a digital front end (DFE) 1, an engine controller 2, a print engine 3 and an inspection apparatus 4. Based on a received print job, the DFE 1 generates bitmap data, which is image data to be output (i.e., output-target image), and outputs the generated bitmap data to the engine controller 2.

Based on the bitmap data received from the DFE 1, the engine controller 2 controls the print engine 3 to conduct an image forming operation. Further, the engine controller 2 transmits the bitmap data received from the DFE 1 to the inspection apparatus 4, wherein the bitmap data is used as data of original information for preparing an inspection reference image to be used for inspection at the inspection apparatus 4 when the inspection apparatus 4 inspects an output result of an image forming operation of the print engine 3.

Under the control of the engine controller 2, the print engine 3 conducts an image forming operation on a recording medium such as paper using the bitmap data, and scans an output paper such as a paper printed with an image using a scanner, and inputs the scanned image data to the inspection apparatus 4. The recording medium may be, for example, a sheet such as paper, film, plastic sheet, and any material that can be used for outputting (i.e., forming) an image by an image forming operation. Based on the bitmap data input from the engine controller 2, the inspection apparatus 4 generates a master image. Then, the inspection apparatus 4 compares the scanned image data, input from the print engine 3, and the generated master image to conduct an image inspection of output image, in which the inspection apparatus 4 is used as an image inspection apparatus.

Figure 2:
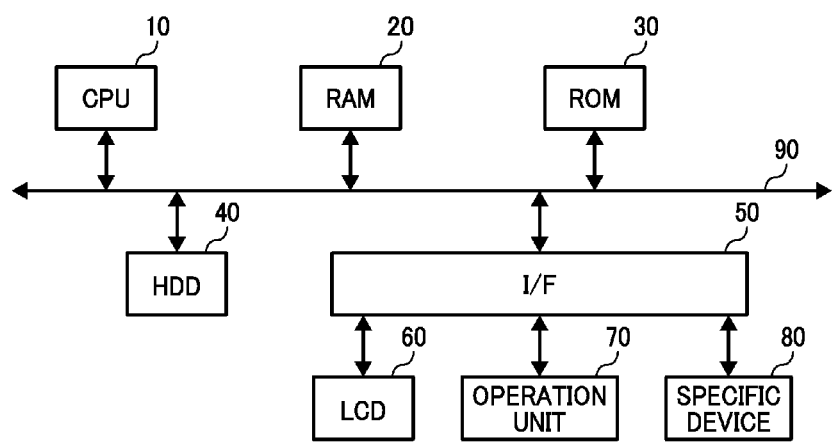
FIG. 2 shows an example block diagram of a hardware configuration of the inspection apparatus according to an example embodiment.

A description is given of a hardware configuration of the engine controller 2, the print engine 3 and the inspection apparatus 4 according to an example embodiment with reference to FIG. 2. Further, as for the inspection apparatus 4, engines for scanner and printer may be added to the hardware configuration shown in FIG. 2. FIG. 2 shows a block diagram of an example hardware configuration of the inspection apparatus 4. The engine controller 2 and the print engine 3 may have a hardware configuration similar to the inspection apparatus 4 shown in FIG. 2.

As shown in FIG. 2, the inspection apparatus 4 can be configured similarly to information processing apparatuses such as general servers, and personal computers (PC), or the like. Specifically, the inspection apparatus 4 includes a central processing unit (CPU) 10, a random access memory (RAM) 20, a read only memory (ROM) 30, a hard disk drive (HDD) 40, and an interface (I/F) 50, connectable to each other via a bus 90. Further, the I/F 50 is connectable to a liquid crystal display (LCD) 60, an operation unit 70, and a specific device 80.

The CPU 10 is a computing processor or unit which controls the inspection apparatus 4 as a whole. The CPU 10 can be configured with various types of processors, circuits, or the like, such as a programmed processor, a circuit, and an application specific integrated circuit (ASIC), used singly or in combination. The RAM 20 is a volatile memory, to which data or information can be written and read at high speed, and is used as a working memory when the CPU 10 processes data or information. The ROM 30 is a non-volatile memory used as a read only memory, and stores programs such as firmware or the like. The HDD 40 is a non-volatile storage device, to and from which data or information can be written and read, and stores operating system (OS), management or control software programs, application software programs, various data, or the like.

The I/F 50 can be used to connect various types of hardware and network to the bus 90, and controls such connection. The LCD 60 is a user interface to display information, with which the status of the inspection apparatus 4 can be checked by a user. The operation unit 70 is a user interface such as a keyboard, a mouse, etc., with which information can be input to the inspection apparatus 4 by the user.

The specific device 80 may be disposed as hardware to conduct a specific capability or function for each of the engine controller 2, the print engine 3 and the inspection apparatus 4. For example, as for the print engine 3, the specific device 80 may be a plotter to conduct an image forming operation on sheets, and a scanner to scan images output on the sheets.

Further, as for the engine controller 2 and the inspection apparatus 4, the specific device 80 may be a specific computing circuit to conduct high speed image processing, and the specific device 80 may be, for example, an application specific integrated circuit (ASIC).

In the above hardware configuration, software programs stored in a storage area such as the ROM 30, the HDD 40, or an optical disk can be read and loaded to the RAM 20, and the CPU 10 runs such programs to control various units, with which a software-executing controller can be configured. With a combination of such software-executing controller and hardware, a functional block to operate the engine controller 2, the print engine 3 and the inspection apparatus 4 can be configured. In an example embodiment, at least one of the units is implemented as hardware or as a combination of hardware/software.

Figure 3:
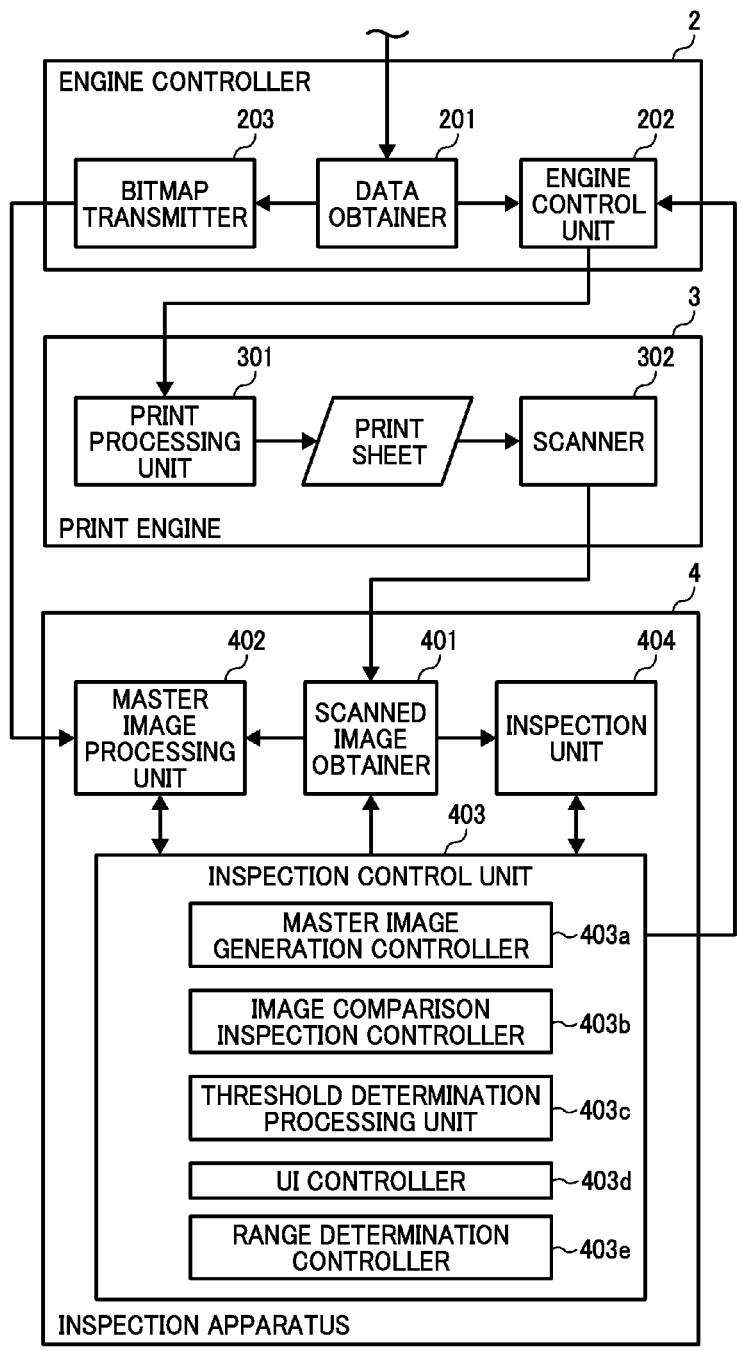
FIG. 3 shows an example block diagram of an engine controller, a print engine and an inspection apparatus according to an example embodiment.

FIG. 3 shows an example block diagram of the engine controller 2, the print engine 3 and the inspection apparatus 4. As shown in FIG. 3, the engine controller 2 includes, for example, a data obtainer 201, an engine control unit 202 and a bitmap transmitter 203. Further, the print engine 3 includes, for example, a print processing unit 301 and a scanner 302. Further, the inspection apparatus 4 includes, for example, a scanned image obtainer 401, a master image processing unit 402, an inspection control unit 403 and an inspection unit 404. The inspection unit 404 can be used as an image inspection unit that compares images for inspection.

Upon obtaining the bitmap data from the DFE 1 by the data obtainer 201, the engine control unit 202 and the bitmap transmitter 203 are operated. The bitmap data is information of pixels composing an image to be output by an image forming operation, and the data obtainer 201 can function as a pixel information obtainer. Based on the bitmap data transferred from the data obtainer 201, the engine control unit 202 instructs the print engine 3 to conduct an image forming operation, in which the engine control unit 202 can function as an output execution control unit. The bitmap transmitter 203 transmits the bitmap data, obtained by the data obtainer 201, to the inspection apparatus 4.

The print processing unit 301 obtains the bitmap data input from the engine controller 2, conducts an image forming operation to a sheet, and outputs a printed sheet. Therefore, the print processing unit 301 can function as an image forming apparatus. The print processing unit 301 can use any types of image forming mechanisms, for example, the electrophotography, the inkjet method, or the like. The scanner 302 scans an image formed on the sheet by conducting a printing operation by the print processing unit 301, and outputs scanned data to the inspection apparatus 4. The scanner 302 is, for example, a line scanner disposed along a transport route of sheet output by the print processing unit 301, in which the scanner 302 scans the transported sheet face to read an image formed on the sheet.

Figure 4:
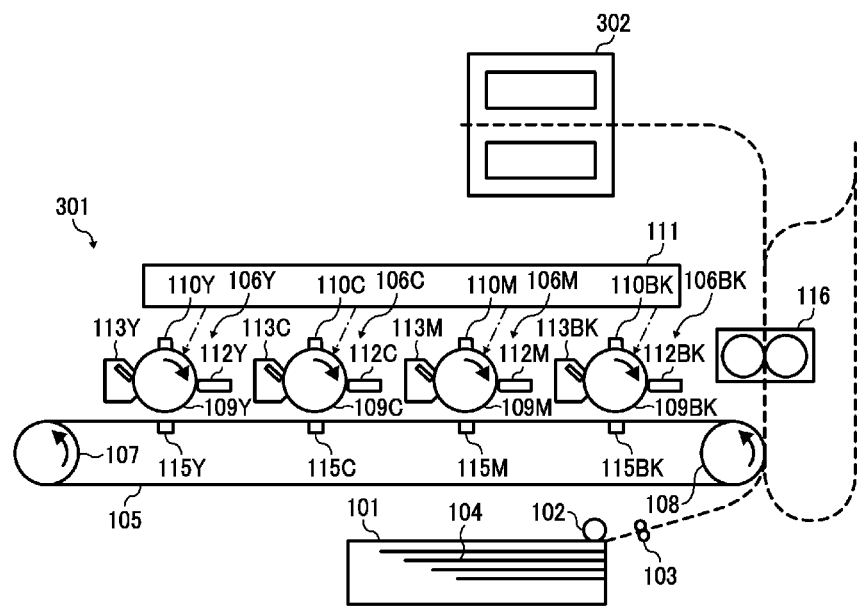
FIG. 4 shows a schematic mechanical configuration of a print processing unit according to an example embodiment.

A description is given of mechanical configurations of the print processing unit 301 and the scanner 302 with reference to FIG. 4. As shown in FIG. 4, the print processing unit 301 includes, for example, image forming units 106BK, 106M, 106C, 106Y and a transport belt 105 of an endless movement unit, in which the image forming units 106BK, 106M, 106C, 106Y are disposed along the transport belt 105, which is referred to as the tandem type. Specifically, the image forming units 106BK, 106M, 106C, 106Y (electrophotography processing units) are disposed along the transport belt 105 from the upstream side of a transport direction of the transport belt 105. An intermediate transfer image is formed on the transport belt 105, and transferred to a recording medium such as a sheet 104, which is separated and fed from a sheet tray 101 using a sheet feed roller 102 and a separation roller 103.

The internal configuration is common for the image forming units 106BK, 106M, 106C, 106Y except color of toner image, which means the image forming unit 106BK forms black image, the image forming unit 106M forms magenta image, the image forming unit 106C forms cyan image, and the image forming unit 106Y forms yellow image. Hereinafter, the image forming unit 106BK is described as the representative of the image forming units 106BK 106M, 106C, 106Y. Each members composing the image forming units 106BK 106M, 106C, 106Y may be attached with BK, M, C, Y as required.

The transport belt 105 is an endless belt extended by a drive roller 107 and a driven roller 108. The drive roller 107 can be rotated by a drive motor. The drive motor, the drive roller 107 and the driven roller 108 can be collectively function as a drive unit for the transport belt 105 which is the endless movement unit.

When forming images, the image forming unit 106BK transfers black toner image to the rotating transport belt 105. The image forming unit 106BK includes, for example, a photoconductor drum 109BK used as a photoconductor, a charger 110BK disposed near the photoconductor drum 109BK, a development unit 112BK, a photoconductor cleaner, and a decharger 113BK. Further, an optical writing unit 111 irradiates light for each of the photoconductor drums 109BK, 109M, 109C, 109Y (hereinafter, photoconductor drum 109).

When forming images, an outer face of the photoconductor drum 109BK is charged uniformly by the charger 110BK in a dark environment, and then an electrostatic latent image for black image is formed on the photoconductor drum 109BK by irradiating light from a light source for black image in the optical writing unit 111. The development unit 112BK develops the electrostatic latent image using black toner, and then black toner image is formed on the photoconductor drum 109BK.

The black toner image is transferred to the transport belt 105 at a transfer position of the photoconductor drum 109BK and the transport belt 105 by a transfer unit 115BK, in which the photoconductor drum 109BK and the transport belt 105 may contact or be the closest with each other. With this transfer, the black toner image is formed on the transport belt 105. Upon completing the transfer of black toner image, the photoconductor cleaner removes toner remaining on the outer face of the photoconductor drum 109BK, and then the photoconductor drum 109BK is discharged by the decharger 113BK to prepare for a next image forming operation.

The transport belt 105 transferred with the black toner image by the image forming unit 106BK is transported to the image forming unit 106M, next to the image forming unit 106B, by rotating the transport belt 105. Similar to the image forming process at the image forming unit 106BK, the image forming unit 106M forms magenta toner image on the photoconductor drum 109M, and the magenta toner image may be superimposed and transferred on the black toner image.

The transport belt 105 having the transferred black toner image and magenta toner image is then transported to the image forming units 106C, 106Y. Similar to the image forming unit 106BK, cyan toner image formed on the photoconductor drum 109C, and yellow toner image formed on the photoconductor drum 109Y may be superimposed and transferred on the black toner image and magenta toner image, with which the intermediate transfer image of full color is formed on the transport belt 105.

The sheet 104 stacked in the sheet tray 101 is fed from the top sheet, and the intermediate transfer image formed on the transport belt 105 is transferred on the sheet 104 at a transfer position that the transport belt 105 and the sheet 104 contact or be the closest with each other in the transport route, with which an image is formed on the sheet 104. The sheet 104 formed with the image is transported to a fusing unit 116 to fuse the image on the sheet 104, and then ejected from the image forming apparatus.

In the fusing unit 116, the toner image transferred on the sheet 104 is fused by heat, in which water included in the sheet 104 is vaporized when the sheet 104 is passing through the high temperature fusing unit 116, with which the sheet 104 shrinks and therefore the image size on the sheet 104 ma be come smaller than the image size of original image. When the scanner 302 scans the shrink sheet 104, the scanned image smaller than the original image may be generated.

Further, when the duplex printing is conducted, the sheet 104 having the fused image is transported to an inverting route to invert the faces of the sheet 104, and then the sheet 104 is transported to the transfer position again. The sheet 104 having the fused image on one face or both faces is transported to the scanner 302. Then, the scanner 302 scans one face or both faces, with which a scanned image, which is an inspection target image, is generated.

A description is given of the inspection apparatus 4 by referring FIG. 3 again. The scanned image obtainer 401 obtains the scanned image data generated by scanning the sheet face by the scanner 302 in the print engine 3, and inputs the scanned image data as an inspection target image to the inspection unit 404. As described above, the master image processing unit 402 obtains the bitmap data input from the engine controller 2, and generates a master image as an inspection reference image to be compared with the inspection target image. Therefore, based on the output-target image, the master image processing unit 402 is used as an inspection reference image generator that generates the master image as the inspection reference image to be used for inspecting the scanned images. The generation process of master image by the master image processing unit 402 will be described later.

The inspection control unit 403 controls the inspection apparatus 4 as a whole, and each unit in the inspection apparatus 4 is operated under the control of the inspection control unit 403. Further, in an example embodiment, the inspection control unit 403 includes, for example, a master image generation controller 403a, an image comparison inspection controller 403b, a threshold determination processing unit 403c, a user interface (UI) controller 403d and a range determination controller 403e as shown in FIG. 3. The inspection unit 404 is used as an image inspection unit that compares the scanned image data, input from the scanned image obtainer 401, and the master image, generated by the master image processing unit 402, to determine whether a desired image forming operation is conducted. The inspection unit 404 may be configured with the above mentioned ASIC or the like to compute a great amount of data with high speed processing.

Figure 5:
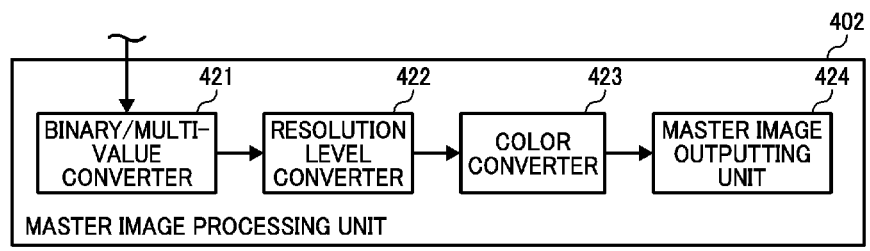
FIG. 5 shows an example block diagram of master image processing unit according to an example embodiment.

A description is given of the master image processing unit 402 with reference to FIG. 5. FIG. 5 shows an example block diagram of the master image processing unit 402. As shown in FIG. 5, the master image processing unit 402 includes, for example, a binary/multi-value converter 421, a resolution level converter 422, a color converter 423 and a master image outputting unit 424. The master image processing unit 402 can be devised as the specific device 80 (see FIG. 2) devised by a combination of hardware and software such as the ASIC controlled by software. The inspection unit 404 and the master image processing unit 402 can be configured using the ASIC as described above. Further, the inspection unit 404 and the master image processing unit 402 can be configured using a software module executable by the CPU 10.

The binary/multi-value converter 421 conducts a binary/multi-value converting process to a binary format image expressed binary such as color/non-color to generate a multi-valued image. The bitmap data is information input to the print engine 3. The print engine 3 conducts an image forming operation based on binary format image for each color of cyan, magenta, yellow, black (CMYK). Because the scanned image data, which is the inspection target image, is a multi-valued image composed of multi-gradient image of the three primary colors of red, green and blue (RGB), a binary format image is initially converted to a multi-valued image by the binary/multi-value converter 421. The multi-valued image is, for example, an image expressed by 8-bit for each CMYK.

Further, the print engine 3 conducts an image forming operation based on binary format image for each of CMYK, and the master image processing unit 402 includes the binary/multi-value converter 421 but not limited hereto. For example, when the print engine 3 conducts an image forming operation based on multi-valued image, the binary/multi-value converter 421 can be omitted.

The resolution level converter 422 conducts a resolution level conversion process to match a resolution level of multi-valued image generated by the binary/multi-value converter 421 to a resolution level of the scanned image data (i.e., inspection target image). Because the scanner 302 generates scanned image data, for example, with the resolution level of 200 dots per inch (dpi), the resolution level converter 422 converts a resolution level of multi-valued image generated by the binary/multi-value converter 421 to 200 dpi.

The color converter 423 obtains the image having converted with the resolution level by the resolution level converter 422 and conducts a color converting process. Because the scanned image data is RGB-format image as described above, the color converter 423 converts the CMYK-format image having converted with the resolution level by the resolution level converter 422 to the RGB-format image, with which a multi-valued image of 200 dpi expressed with 8-bit for each of RGB (total 24 bits) for each pixel is generated.

The master image outputting unit 424 outputs the master image, generated by using the binary/multi-value converter 421, the resolution level converter 422 and the color converter 423, to the inspection control unit 403. Based on the master image obtained from the master image processing unit 402, the inspection control unit 403 instructs the inspection unit 404 to conduct an image comparing process to obtain a comparison result.

Referring back to FIG. 4, the inspection unit 404 compares the scanned image data and the master image expressed with 8-bit for each of RGB (total 24 bits) as described above for each corresponding pixel, and computes difference of pixel values for each of RGB for each pixel. Based on the comparison of the computed difference and a threshold, the inspection unit 404 determines whether a defect occurs to the scanned image data. Therefore, the inspection unit 404 can function as an image inspection unit to determine defect of the scanned image data based on difference of the inspection reference image and the scanned image data. Further, the difference computed for each of pixels can be correlated for each of pixel positions and can be configured as a differential image.

Further, the difference and the threshold can be compared by the inspection unit 404 as follows. For example, values of difference computed for each of pixels are summed for a given area of an image as a total value, and the total value is compared with the threshold, which is set to be compared with the total value. The given area for summing the values of difference of each of pixels is, for example, a 20-dot square area. In an example embodiment, therefore, the threshold is a value set for the total difference value of the given area (hereinafter, defect determination unit area) obtained by summing the difference values. Therefore, the inspection unit 404 outputs position information of the defect determination unit area on an image having a total difference value exceeding the threshold, wherein this position information can be used as information indicating the presence of defect in the scanned image data. The position information in the image is defined by, for example, coordinate information on image.

Figure 22:
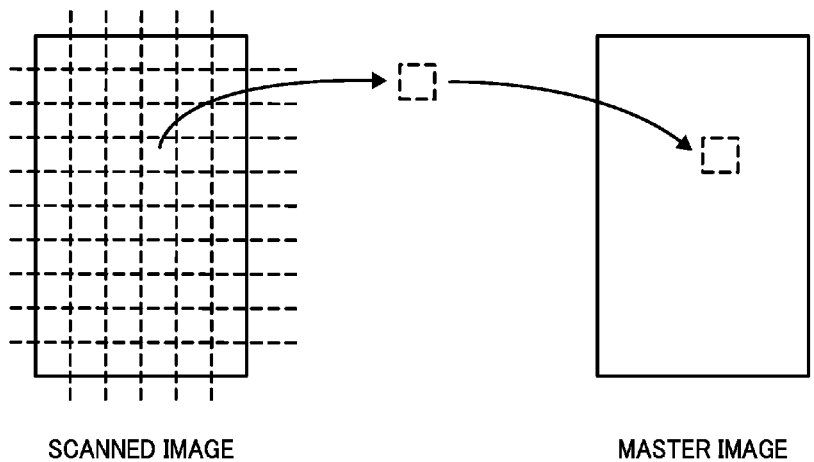
FIG. 22 shows a schematic process of comparing images for inspection according to an example embodiment.

When comparing the scanned image and the master image, the scanned image is divided into a plurality of areas as shown in FIG. 22. The inspection unit 404 superimposes each divided area to a corresponding area of the master image to compute a difference of pixel value of each pixel such as difference of density. Further, a position of superimposing the divided area to the master image is shifted left/right and up/down to determine a position that the computed difference becomes the smallest and the smallest difference is used as a comparison result. Each one of the divided areas shown in FIG. 22 can be used as the above described defect determination unit area.

Figure 23:
FIG. 23 shows an example of threshold setting according to an example embodiment.

Further, the above described threshold can be provided by register setting to the inspection unit 404 configured as, for example, ASIC. The inspection control unit 403, which is configured by executing a program by the CPU 10, writes a threshold, set as shown in FIG. 23, to the register provided to designate a threshold for the inspection unit 404, with which the above described threshold can be set.

Further, in another method, each pixel is determined as normal or defect based on a comparison result of the difference computed for each pixel and the threshold, and the count number of pixels determined as defect and the threshold set for the count number are compared.

In the system according to an example embodiment, when setting thresholds used for the image comparing process by the inspection unit 404, thresholds matched to inspection precision, which may be desired by a user, can be set easily, and therefore, each of the modules included in the inspection control unit 403 can be used to determine the above mentioned threshold using each unit of the inspection apparatus 4. A description is given of a process of setting the threshold with reference to FIG. 6.

Figure 6:
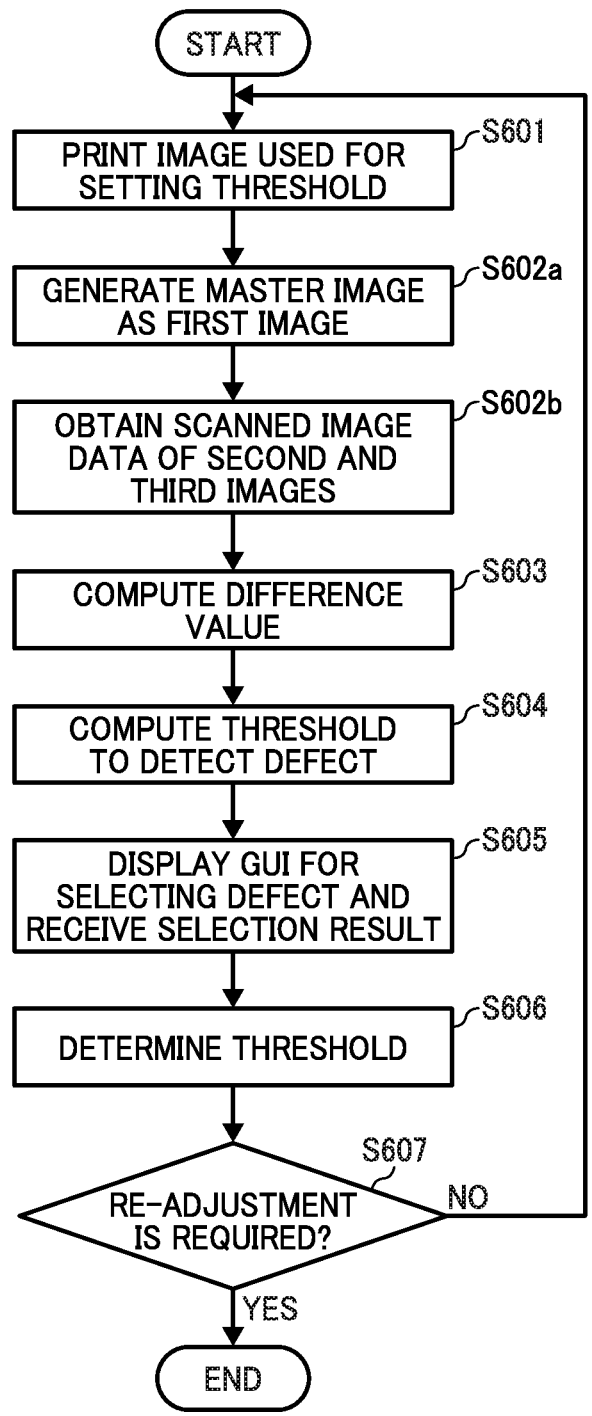
FIG. 6 is a flowchart of process of a threshold determination process according to an example embodiment.
Figure 7A:
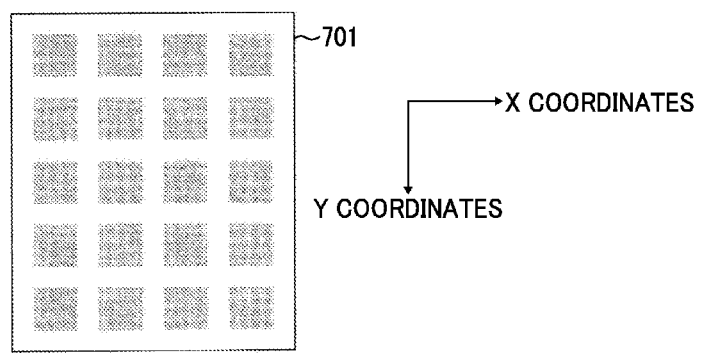
FIGS. 7A, 7B and 7C show examples of output images used for threshold determination process according to an example embodiment.
Figure 7B:
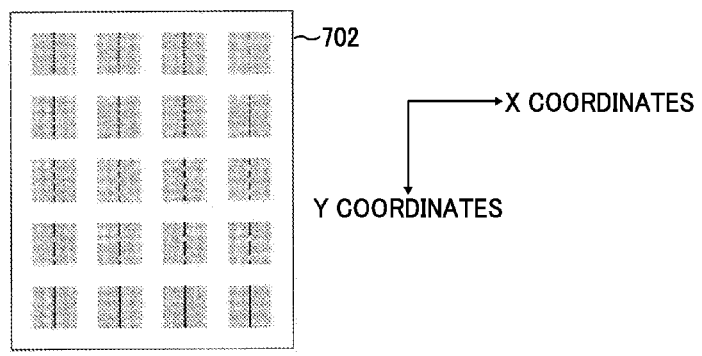
Figure 7C:
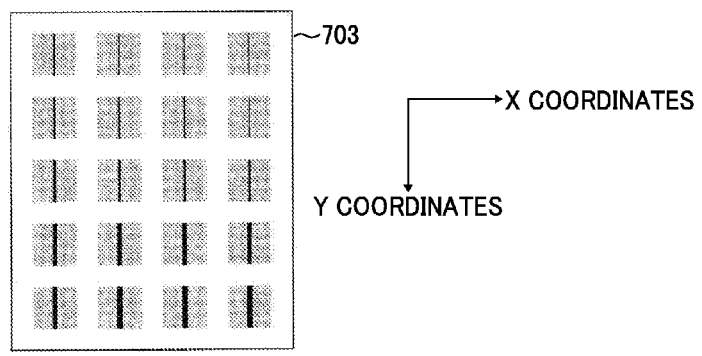

FIG. 6 is a flowchart of process of setting threshold according to an example embodiment. As shown in FIG. 6, when setting the threshold, under the control of the engine controller 2, the print engine 3 conducts a printing operation for images used for setting thresholds (hereinafter, referred to as threshold setting image) (S601). FIGS. 7A to 7C show examples of threshold setting images according to an example embodiment. As for the threshold setting images, FIG. 7A shows reference image pattern 701, which is an image having normal image condition not added artificial defects, and the reference image pattern is used to determine thresholds. As shown in FIG. 7A, the reference image pattern 701 can be drawn and formed in 4 rows in the horizontal direction or the X direction, and 5 lines in the vertical direction or the Y direction for given color mark. The images of FIG. 7A can be output as a first image using the print engine 3 under the control of the engine controller 2.

By contrast, FIGS. 7B and 7(c) show threshold setting images prepared by adding a plurality of different artificial defects to the above described reference image of normal condition. FIG. 7B show images prepared by adding artificial defects having different color densities to the above described reference image pattern (hereinafter, density-changed defect pattern 702). As shown in FIG. 7B, the density-changed defect pattern 702 can be prepared by adding different artificial defects to each one of marks arranged in the X direction and the Y direction. The images of FIG. 7B can be output as a second image using the print engine 3 under the control of the engine controller 2.

As for the density-changed defect pattern, each mark arranged in the X direction is added with artificial defects of different colors, and each mark arranged in the Y direction is added with artificial defects of different densities. Therefore, the images of FIG. 7B are images added with a plurality of artificial defect having different colors and density levels. FIG. 8 shows an example of information referred by the engine control unit 202 of the engine controller 2 when outputting the density-changed defect pattern 702 shown in FIG. 7B (hereinafter, density-changed defect pattern information). Further, information of the density-changed defect pattern of FIG. 8 can be stored, for example, in a storage included in the engine controller 2 such as the RAM 20, ROM 30, HDD 40, and/or an external storage.

In FIG. 8, PC, PM, PY and PK are values indicating colors such as C, M, Y, K for the pattern. As shown in FIG. 8, as for the density-changed defect pattern information, each pattern arranged in 4 rows in the X direction and 5 lines in the Y direction is set with color information of artificial defects. For example, as a pattern for the first line/first row, PC is added with $d_1$, and as for other M, Y, K in the first line, the same value of color are added with as artificial defect, in which $d_1$ is added to PM at the second row, to PY at the third row, and to PK at the fourth row, with which artificial defects having colors different from the original pattern can be prepared.

Further, as shown in FIG. 8, adding values can be changed such as $+d_1$, $+d_2$, $+d_3$ ... in the Y direction, in which the greater the value of n of $d_n$, the greater the density, which means, in the Y direction, color density becomes thicker by adding values of artificial defects. The change of density is indicated in FIG. 7B by using line patterns such as dot line, dashed line, or the like.

When outputting the density-changed defect pattern shown in FIG. 7B, the engine control unit 202 obtains settings for a range for changing density, and determines a value of $d_n$ shown in FIG. 8 based on the obtained settings for the range. The settings for the range may include values that may be set for the engine control unit 202 in advance, or set manually by a user when outputting the density-changed defect pattern.

The $d_n$ can be obtained using the following formula (I) by setting the lower limit $d_m$ and the upper limit $d_M$ for the settings of the range.

$$d_n = d_m + \frac{1}{4}(d_M - d_m) \times n \qquad (1)$$

Figure 24:
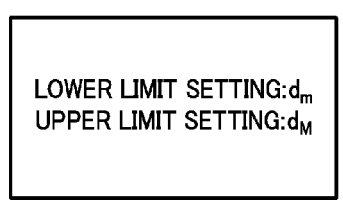
FIG. 24 shows an example of upper and lower limits setting according to an example embodiment.

Based on the computation using the above formula (1), the range of from $d_m$ to $d_M$ can be divided equally, for example, by five values of $d_1$ to $d_5$, and can be used as the adding values of density. The $d_m$ and $d_M$ can be provided as setting values as shown in FIG. 24 according to an example embodiment.

FIG. 7C show images prepared by adding artificial defects having different line width to the above described reference image pattern (hereinafter, width-changed defect pattern 703). Similar to the density-changed defect pattern, as shown in FIG. 7C, the width-changed defect pattern 703 can be prepared by adding different artificial defects to each one of marks arranged in the X direction and the Y direction. Similar to the images of FIG. 7B, the images of FIG. 7C are images added with a plurality of artificial defect different in color and width. The images of FIG. 7C can be output as a third image using the print engine 3 under the control of the engine controller 2. Similar to the density-changed defect pattern 702, as for the width-changed defect pattern 703, each mark arranged in the X direction is added with artificial defects of different colors, and each mark arranged in the Y direction is added with artificial defects of different width.

Similar to the density-changed defect pattern, the engine control unit 202 changes width of artificial defects within a set range for changing width of artificial defects shown in FIG. 7C. The range of changing width can be computed using the above formula (I) as $d_n$ of width of artificial defects. Further, the engine control unit 202 stores the computed $d_n$ to be used for a later processing.

Further, in an example embodiment, the engine control unit 202 can generate bitmap data used for an image forming operation of the patterns shown in FIG. 7A to FIG. 7C, but the DFE 1 can generate bitmap data.

In the process at S601, the engine controller 2, the print engine 3 and the inspection apparatus 4 respectively conduct the above described operations, in which the engine controller 2 transmits the bitmap data to the inspection apparatus 4, and data of the scanned image, generated in the print engine 3 by scanning the output sheet using the scanner 302, is input to the inspection apparatus 4. Then, when setting the thresholds, based on the bitmap data input from the engine controller 2, the inspection apparatus 4 generates a master image based on bitmap data of the first image (S602a), and selects and obtains data of scanned image of the second image and the third image (S602b).

In the process at S602a, among bitmap data of the first, second and third images input from the engine controller 2, the master image generation controller 403a of the inspection control unit 403 controls the master image processing unit 402 to generate a master image only for the first image. The master image is used as the inspection reference image as described above. The master image is also referred to as a normal reference image used for inspection, and the normal reference image is used as the inspection reference image for the preparing the above described threshold setting image.

Further, in the process at S602b, the image comparison inspection controller 403b of the inspection control unit 403 controls the scanned image obtainer 401 to discard the scanned image data of the first image from the scanned image data of the first, second and third images input from the print engine 3, and obtains the scanned image of the second image and the third image. The scanned image data is image data obtained by scanning the above described threshold setting image, wherein scanned image data is also referred to as defect scanned image.

Then, the image comparison inspection controller 403b of the inspection control unit 403 controls the inspection unit 404 to compare the above described master image of first image and the scanned image of the second and third images (image comparing process) to compute the above described difference for each of the second image and the third image to obtain a differential image (S603).

Upon obtaining the differential image for the second image and the third image with respect to the master image, as explained with reference to FIGS. 7A to 7C, the threshold determination processing unit 403c of the inspection control unit 403 computes a threshold to detect an artificial defect artificially added in each of marks arranged in rows and lines as defect (S604). In the process of S604, as shown in FIG. 9, threshold such as th11, th12 . . . can be computed for each of marks arranged in 4 rows in the X direction and 5 lines in the Y direction. In S604, based on the difference generated for each one of a plurality of artificial defects having different colors and levels, a threshold to be used for determining each one of the plurality of artificial defects as defect can be computed, and the each computed threshold is referred to as discrete threshold. Further, information shown in FIG. 9 can be stored, for example, in a storage included in the inspection unit 404 such as the RAM 20, ROM 30, HDD 40, and/or an external storage.

FIG. 9 shows an example of a table having discrete thresholds. In an example embodiment, a discrete threshold is set for each mark included in the second image and the third image. Therefore, the table shown as FIG. 9 can be generated for each of the second image and the third image.

Figures 10, 11:
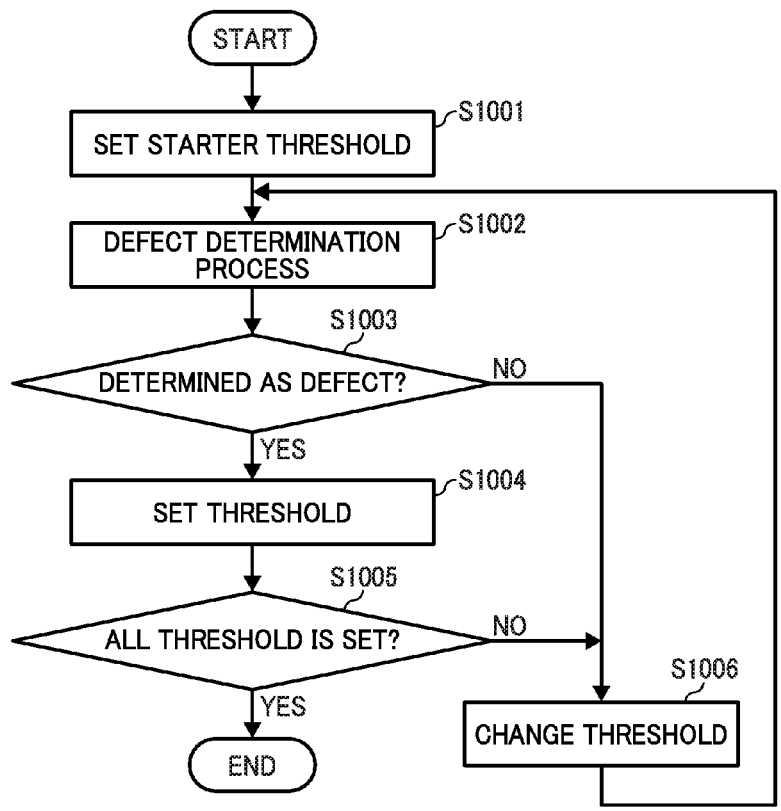
FIG. 10 is a flowchart of process of computing discrete threshold according to an example embodiment.
FIG. 11 show an example of information indicating mark position on an output image for a threshold determination process according to an example embodiment.

A description is given of a detail of S604 (FIG. 6) with reference to FIG. 10. As shown in FIG. 10, the threshold determination processing unit 403c sets a starter threshold (S1001) at first. The starter threshold is a threshold that any types of defect are not extracted as defect, which means that even if a total difference value for the defect determination unit area is great, a value greater than the total difference value for the defect determination unit area is set as the starter threshold, with which no defect is determined as defect.

Upon setting the starter threshold, the threshold determination controller 403a of the inspection control unit 403 controls the inspection unit 404 to conduct a defect determination process based on the set threshold (S1002). In S1002, a defect determination process is conducted for an entire image by conducting a defect determination process for each defect determination unit area. In S1002, as described above, in the defect determination process, a total difference and a threshold are compared to determine whether each defect determination unit area is defect.

Then, the inspection control unit 403 stores coordinates of areas on an image displaying each mark as shown in FIG. 11 in advance, and compares coordinates of determination unit area determined as defect and coordinates stored in advance to determine which mark is determined as defect. Further, information shown in FIG. 11 can be stored in advance in the inspection control unit 403 or can be input from the engine control unit 202 or other device each time when the threshold setting process is conducted.

If each area displaying a mark is determined as current defect based on the determination result of S1002 (S1003: YES), the threshold determination processing unit 403c registers or sets a currently-used threshold as a threshold for the area determined as current defect to the table shown in FIG. 9 (S1004). With this processing, each discrete threshold such as th11, th12 and so on shown in FIG. 9 can be registered.

Upon completing S1004, the threshold determination processing unit 403c checks whether a threshold is set for all of areas (S1005). If the threshold is set for all of areas as shown in FIG. 9 (S1005: YES), the process ends. By contrast, if no area is determined as current defect when S1002 is conducted (S1003: NO), or if the threshold is not yet set for all of areas (S1005: NO), the threshold determination processing unit 403c changes a value of the threshold to increase the probability to be determined as defect (S1006), and repeats the process from S1002.

In an example embodiment, the threshold determination processing unit 403c can change values of threshold gradually to increase the probability to be determined as a defect, and repeats the defect determination process until all of areas are determined as defect. With this processing, as explained with reference to FIGS. 7B and 7C, thresholds matched to an actual defect determination process can be determined based on thresholds used for extracting various artificial defects having different levels. Further, in an example embodiment, because the defects can be determined based on the scanned image data generated by the scanner 302, thresholds matched to the images scanned real time by the scanner 302 can be set.

Figure 12A:
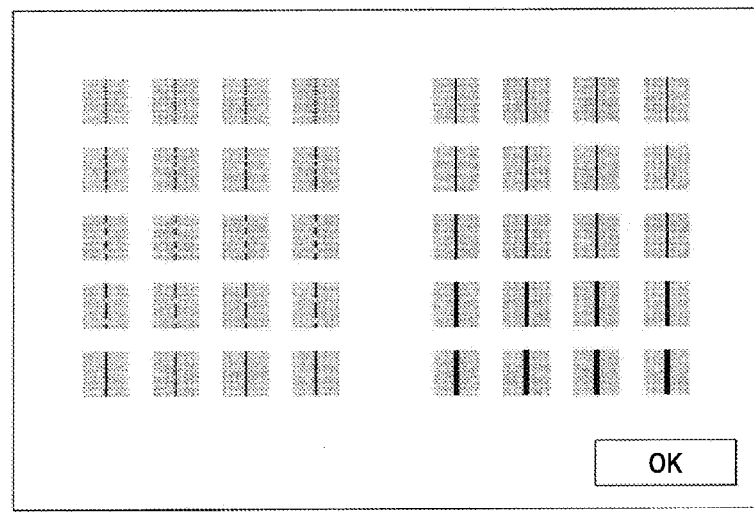
FIGS. 12A and 12B show examples of threshold selection screens according to an example embodiment.
Figure 12B:
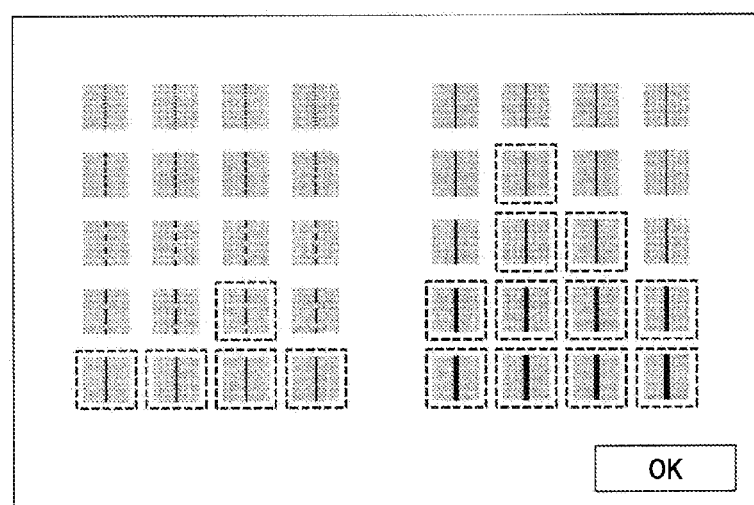

Upon completing the process of S604, the UI controller 403d controls a display unit to display a graphical user interface (GUI), which is used by a user to set a threshold, and the inspection control unit 403 receives a selection result input by a user's operation (S605). The GUI displayed in S605 is referred to as a threshold selection screen hereinafter, and FIGS. 12A and 12B show examples of threshold selection screens. The threshold selection screens shown in FIGS. 12A and 12B can be displayed on a display unit such as the LCD 60 connected to the inspection apparatus 4. FIG. 12A shows an initial screen of GUI displayed in S605, which means a screen before a user's selection operation.

As shown in FIG. 12A, the threshold selection screen displays images of the density-changed defect pattern and the width-changed defect pattern described with reference to FIGS. 7B and 7C. These images can be displayed using, for example, the second image and the third image obtained by the scanned image obtainer 401. The user can select one or more marks to be identified as defect on the screen shown in FIG. 12A.

When selecting the mark on the screen shown in FIG. 12A, the user operates the screen, but the mark is selected by looking the output sheet (i.e., not selected on the screen), in which the user can determine the defect based on the defect actually output on the sheet. FIG. 12B shows an example screen when images to be identified as defect are selected by the user. As shown in FIG. 12B, the mark selected by the user is displayed on the screen with high-lighted condition such as encircling frame.

When the mark is selected as described above, the UI controller 403d obtains the selection result, and the threshold determination processing unit 403c can set a threshold to detect each mark as defect by referring the table shown in FIG. 9. Specifically, when the UI controller 403d receives the user's selection at S605, the threshold determination processing unit 403c extracts a discrete threshold, corresponding to the defect selected by the user shown in as shown in FIG. 12B, from the table shown in FIG. 9. In this process, the UI controller 403d recognizes one or more defects selected by an operation to the screen shown in FIG. 12A by a user.

Specifically, when one or more marks are selected as defect as shown in FIG. 12B, the threshold determination processing unit 403c obtains information of arrangement position of the selected defect on the image, and identifies the arrangement in X direction and the arrangement in Y direction indicated in the table of FIG. 9. Then, the threshold determination processing unit 403c extracts information of threshold corresponding to the arrangement position of the selected defect such as th11, th21 and so on from the table shown in FIG. 9.

Upon extracting the discrete thresholds for the selected defects (FIG. 12B) from the table of FIG. 9, the threshold determination processing unit 403c determines a finally-set threshold based on the extracted discrete thresholds (S606). In S606, among the extracted discrete thresholds corresponding to the marks selected by the user as to-be-determined as defect, the threshold determination processing unit 403c determines one of the discrete thresholds as the finally-set threshold, in which a discrete threshold having the strictest threshold is determined as the finally-set threshold. When the strictest threshold is set as the finally-set threshold, the greater number of marks can be determined as defect. The threshold determined with this process can be stored as the threshold setting as shown in FIG. 23, and when the inspection unit 404 conducts an inspection by comparing images, a threshold can be provided to the inspection unit 404 by writing the threshold as a register value by the inspection control unit 403.

Upon determining the finally-set threshold, the threshold determination processing unit 403c determines whether re-adjustment is required based on the user's operation (S607), in which the UI controller 403 obtains an operation instruction by the user. In S607, the threshold determination processing unit 403c controls a display unit such as the LCD 60 connected to the inspection apparatus 4 to display a screen for selecting whether the re-adjustment is required, and determines whether the re-adjustment is required based on the user's operation to the screen.

If the re-adjustment is not required (S607: NO), the threshold determination processing unit 403c ends the process. By contrast, if the re-adjustment is required (S607: YES), the threshold determination processing unit 403c instructs the engine controller 2 to repeat the steps from S601 and controls the inspection apparatus 4, in which as described above, the inspection control unit 403 designates a range of changing density and/or width of the density-changed defect pattern or the width-changed defect pattern. Specifically, the threshold determination processing unit 403c can designate $d_n$ for the mark having the maximum value $d_M$ and the minimum value $d_m$ for each discrete threshold extracted at S605.

As described above, the $d_n$ computed for each mark can be stored in the storage included in the engine controller 2 such as the RAM 20, ROM 30, HDD 40, and/or the external storage. Therefore, the threshold determination processing unit 403c can designate "$d_n$" for each of the density-changed defect pattern and the width-changed defect pattern to the engine control unit 202 by only notifying a position in the Y direction of a mark corresponding to the above described maximum value and minimum value.

Further, at S605, a discrete threshold can be extracted for each of the density-changed defect pattern and the width-changed defect pattern. Therefore, the threshold determination processing unit 403c designates $d_n$ for a mark corresponding to the maximum value and the minimum value of each discrete threshold extracted at S605 for each of the density-changed defect pattern and the width-changed defect pattern.

When the process of S601 is to be conducted repeatedly, the mark added with the artificial defect corresponding to the maximum value and the minimum value of the discrete threshold, extracted by the process at S605 by already conducting the threshold setting process once, can be formed as the density-changed defect pattern and the width-changed defect pattern. By conducting the process of FIG. 6 for the second image and the third image, the threshold can be set more precisely.

In the system of an example embodiment, images displaying defects having changed the defect level step-wisely as shown in FIGS. 7B and 7C are prepared. By conducting the defect determination process by changing the thresholds step-wisely, discrete thresholds that can detect each of defects having step-wisely changed defect levels can be obtained. Then, the user checks a sheet printed with a given pattern with eyes to select one or more marks to be determined as defect, and determines the finally-set threshold based on the discrete threshold correlated to the selected marks. With this processing, when the image inspection is conducted based on a comparison result obtained by comparing an image generated by scanning an image output by an image forming operation and a master image, the setting of threshold used for determining the defect can be conducted easily and preferably based on the comparison result.

In the above described example embodiment, when repeatedly conducting the adjustment of threshold, levels of artificial defects are changed depending on a selection result by a user, but when the adjustment of threshold is initially activated, the level of artificial defect is required to be determined without the user's selection. In this case, depending on the capability of the scanner 302 of the print engine 3 and the conditions of the scanner 302, the levels of defects that can be identified may become different.

For example, when identifying a defect of stripe shape, a stripe having a narrow width cannot be scanned depending on a scan-able resolution capability of the scanner 302. Further, when identifying a defect of density change, if a level of density change from a normal condition is small, for example, if the density change is a pale appearance, depending on a density resolution capability of the scanner 302, the scanned image cannot be distinguished between a defect condition and a normal condition, because pixel values of the scanned image data may not be different between the defect condition and the normal condition.

Therefore, if the images shown in FIGS. 7B and 7C are output when the adjustment of threshold is initially activated and the image include a defect having a level that cannot be detected by the scanner 302, and a user selects this undetectable defect, a preferable threshold may not be set. Therefore, in the system according to an example embodiment, a calibration is conducted to limit a range of defect levels added as the density-changed defect pattern and/or the width-changed defect pattern. A description is given of a calibration process according to an example embodiment.

In the calibration process according to an example embodiment, the print processing unit 301 outputs a calibration-use image, the scanner 302 generates scanned image of the calibration-use image, and the inspection apparatus 4 conducts a defect determination process for the calibration-use image similar to the normal defect determination process, with which a range of defect that can be identified or detected by the scanner 302 can be determined. With this processing, the value of $d_m$ and $d_M$ shown in FIG. 24 can be determined and set. A description is given of calibration-use image according to an example embodiment with reference to FIG. 13.

Figure 13:
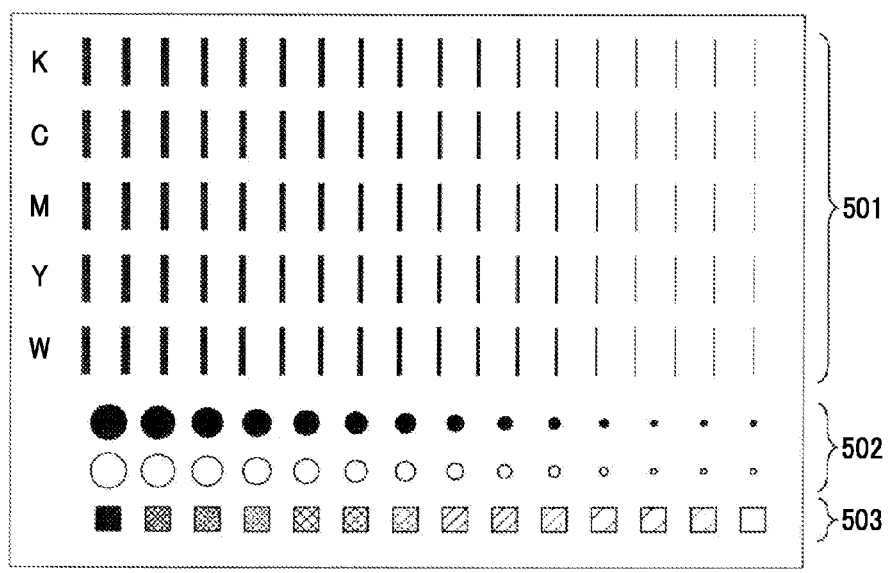
FIG. 13 shows an example of calibration-use image according to an example embodiment.

FIG. 13 shows an example of calibration-use image, which mean the image shown in FIG. 13 can be used as range determination image. As shown in FIG. 13, the calibration-use image includes, for example, a stripe defect pattern 501, a dot defect pattern 502 and a density defect pattern 503. The stripe defect pattern 501 includes stripe defect patterns of CMYK and white (W) by arranging from bold width to thin width. By using this pattern, it can confirm a level of stripe defect pattern that can be detected as defect based on the levels of width of stripe.

Further, as shown in FIG. 13, the stripe defect patterns of W are formed. This stripe defect pattern of W can be used as white stripe patterns occurring when a background color is non-white. Therefore, a background color of an entire calibration-use image shown in FIG. 13 may be set non-white, or a background color corresponding only to the W pattern in the stripe defect pattern 501 may be set non-white.

The dot defect pattern 502 includes dot defect patterns of K and W by arranging from large to small dots. By using this pattern, it can confirm levels of dot defect pattern that can be detected as defect based on the levels of dot size. Further, similar to the W pattern of the stripe defect pattern 501, the white (W) dot defect pattern is formed in the dot defect pattern 502. Therefore, a background color of an entire calibration-use image shown in FIG. 13 may be set non-white, or a background color corresponding only to the W pattern in the dot defect pattern 502 may be set non-white.

The density defect pattern 503 includes density defect patterns of K having a given size and a shape such as tetragon (e.g., square) by arranging from thick to pale colors, that is from black to grey to white. By using this pattern, it can confirm what level of density change can be detected as defect based on density. Further, in FIG. 13, the density change is expressed by types of line such as cross-hatching and slanted line.

Further, in FIG. 13, K and W dot defect are used as the dot defect pattern 502, and K tetragon is used as the density defect pattern 503. Further, dot defects of CMY and a plurality of colors, and density defects of CMY and a plurality of colors can be used.

FIG. 14 shows an example of information used to determine the level of defect that can be used effectively (hereinafter, calibration-use information). The calibration-use information can be prepared by analyzing a defect determination result of the calibration-use image shown in FIG. 13. As shown in FIG. 14, the calibration-use information correlates defect identification (ID), coordinates, defect type and defect detail. The defect ID is used to identify each one of defects. The coordinates indicate a position of each defect displayed on the calibration-use image of FIG. 13. The defect type indicates the types of each defect. The defect detail indicates a detail of each defect.

For example, as for the calibration-use information corresponding to the stripe defect pattern 501, information of "stripe for cyan (C)" and "width of 30 dots" indicates that a stripe is defect of C and its width, and these information is registered. Further, as for the calibration-use information corresponding to the dot defect pattern 502, information of "dot" and "diameter 100 dots" indicates a dot defect and dot defect diameter, and these information is registered. Further, as for the calibration-use information corresponding to the density defect pattern 503, information of "density" and "$C_{21}$, $M_{21}$, $Y_{21}$, $K_{21}$" indicates density defect and density of each color, and these information is registered.

Further, the coordinates information shown in FIG. 13 can use coordinates of a center position of an area displaying each defect but not limited hereto. The coordinate information can use coordinates of top left position of an area displaying each defect, or the coordinate information can use coordinates of top left position and bottom right position of an area displaying each defect to identify the area.

A description is given of a calibration process according to an example embodiment with reference to a flowchart shown in FIG. 15. As shown in FIG. 15, in the calibration process, under the control of the engine controller 2, the print engine 3 conducts a printing operation for the calibration-use image shown in FIG. 13 (S1501).

When the calibration-use image is printed, in the inspection apparatus 4, under the control of the range determination controller 403e of the inspection control unit 403, the master image processing unit 402 generates a master image, and the scanned image obtainer 401 obtains scanned image for the calibration-use image from the scanner 302 (S1502). The scanned image of the calibration-use image can be used as a range determination scanned image. The master image with respect to the calibration-use image of FIG. 13 is a blank image, which is a background color of sheet. Therefore, when the calibration-use image is printed, the master image can be generated as follows. For example, the bitmap transmitter 203 outputs blank bitmap data, and the master image processing unit 402 generates a master image by conducting a normal operation using the blank bitmap data, or the range determination controller 403e notifies the above blank color information to the master image processing unit 402, and the master image processing unit 402 generates the blank master image.

When the master image and the scanned image data are obtained by the inspection apparatus 4, the range determination controller 403e controls the inspection unit 404 to compare the master image and the scanned image (image comparing process) to compute a difference between the master image and the scanned image, and obtains a differential image (S1503). When the differential image for the calibration-use image with respect to the blank master image is obtained, the range determination controller 403e conducts a defect determination using the settable upper limit and lower limit of threshold (S1504). Further, at S1503 and S1504, the defect determination is conducted for each divided area, prepared by dividing an image into a plurality of areas, as explained with reference to FIG. 22.

The above described settable upper limit and lower limit of threshold are the upper limit and the lower limit of the threshold applied to a total difference summed for each defect determination unit area as described above. The upper limit is a value for the broadest allowable range, which means the number of defects not determined as defect becomes the greatest. Further, the lower limit is a value for the narrowest allowable range, which means the number of defects determined as defect becomes the greatest.

As described above, the inspection unit 404 compares the set threshold and the total difference for each defect determination unit area, and outputs coordinate information of an area having the total difference exceeding the threshold. Therefore, the range determination controller 403e can recognize a defect type and defect detail determined as defect by referring the calibration-use information shown in FIG. 14.

FIGS. 16A and 16B schematically show defect determination results using the above described upper limit and the lower limit. FIG. 16A shows patterns determined as defect using the upper limit of the threshold corresponding to the broadest allowable range, and three patterns encircled by dashed lines are determined as defect.

In a case of FIG. 16A, although the threshold of the broadest allowable range is applied, patterns 501a to 501c are determined as defect. Therefore, even if marks corresponding to the pattern 501b and pattern 501c are selected as allowable defect on the screen shown in FIGS. 11A and 11B by a user, such user's instruction cannot be input as an effective instruction, which means the threshold set by the selection result of the user is out of the settable range.

Therefore, range determination controller 403e obtains defect detail information corresponding to the pattern 501c of FIG. 16A, and determines $d_M$ based on the defect detail information, wherein $d_M$ is the upper limit of the range used for changing defect levels described with FIG. 8 (S1505). In S1505, range determination controller 403e can function as a defect range determiner to determine a range of levels of a plurality of artificial defects having different levels, wherein the plurality of artificial defects having different levels can be displayed as the density-changed defect pattern and the width-changed defect pattern.

Further, $d_M$ can be determined by referring the pattern 501c of FIG. 16A, which is a pattern having the smallest level of defect among patterns determined as defect using the threshold having the broadest allowable range. Further, $d_M$ can be determined by referring a pattern, which is next to the pattern 501c and having the greatest defect level among patterns determined not as defect using the threshold having the broadest allowable range.

In a case of FIG. 16B, although a threshold of the narrowest allowable range is applied, patterns 501d to 501h are not determined as defect. Therefore, even if marks corresponding to the patterns 501d to pattern 501h are selected as defect on the screen shown in FIGS. 11A and 11B, such user's instruction cannot be input as an effective instruction, which means thresholds set by the selection result of the user is out of the settable range.

Therefore, the range determination controller 403e obtains defect detail information corresponding to the pattern 501d of FIG. 16B, and determines $d_m$ based on the defect detail information, wherein $d_m$ is the lower limit of the range used for changing defect levels as described with FIG. 8 (S1505). Further, $d_m$ can be determined by referring the pattern 501d of FIG. 16B, which is a pattern having the greatest levels of defect among patterns determined not as defect using the threshold having the narrowest allowable range. Further, $d_m$ can be determined by referring a pattern, which is next to the pattern 501d and having the smallest defect level of among patterns determined as defect using the threshold having the narrowest allowable range.

Further, as explained with reference to FIG. 13, because the calibration-use image includes the stripe defect pattern 501, the dot defect pattern 502 and the density defect pattern 503, the defect determination range shown in FIG. 16A and FIG. 16B can be obtained for each defect pattern. Further, as shown in FIG. 14, defect detail information is registered with information corresponding to each defect pattern such as width of 30 dots, diameter of 100 dot, and $C_{21}$, $M_{21}$, $Y_{21}$, $K_{21}$.

Therefore, the range determination controller 403e obtains values of $d_m$ and $d_M$ by referring defect detail information for each type of defect at S1505. For example, as for $d_m$ and $d_M$ corresponding to the width-changed defect pattern of FIG. 7C, information corresponding to the stripe defect pattern 501, and information corresponding to the dot defect pattern 502 can be obtained from the defect detail information shown in FIG. 14. Further, as for $d_m$ and $d_M$ corresponding to the density-changed defect pattern of FIG. 7B, information corresponding to the density defect pattern 503 can be obtained.

Further, defect detail information corresponding to the density defect pattern 503 of FIG. 14 is information indicating density of the pattern itself, but not information indicating density change from the background color. Therefore, when the range determination controller 403e obtains $d_m$ and $d_M$ information based on the defect detail information corresponding to the density defect pattern 503, the inspection control unit 403 obtains a difference between density information indicated in defect detail information and density information of the background color.

Upon determining the values of $d_m$ and $d_M$ in this process as the setting value shown in FIG. 24, the range determination controller 403e transmits the determined values to the engine controller 2 (S1506), and the process ends. With this processing, the values of $d_m$ and $d_M$ can be input to the engine control unit 202. Therefore, when the engine control unit 202 generates the images of FIGS. 7B and 7(c) for conducting a threshold determination process, the density-changed defect pattern and the width-changed defect pattern can be generated preferably without meaningless selection by a user.

In an example embodiment, as shown in FIGS. 7B and 7C, the density-changed defect pattern and the width-changed defect pattern are used. Further, as shown in FIG. 17, when patterns displaying dot defects having different levels for each mark are used, defect detail information corresponding to the dot defect pattern 502 can be used effectively when obtaining $d_m$ and $d_M$.

Further, in the above described example embodiment, when setting the thresholds, for example, a printing operation of images shown in FIGS. 7A to 7C is conducted. With this configuration, for example, a process of changing a range of to-be-set threshold (e.g. S607 in FIG. 6) can be conducted repeatedly. If the process of changing a range of threshold is not required, bitmap data of images shown in FIG. 7A is input to the master image processing unit 402, and a known scan-use chart having the images similar to the images shown in FIGS. 7B and 7C can be scanned by the scanner 302 of the print engine 3, with which the above described operation can be conducted.

Further, in the above described example embodiment, as shown in FIGS. 12A and 12B, the second image and the third image are displayed on a screen, from which a user can select marks intuitively based on visual information displayed on the screen but not limited hereto. For example, a user can select marks from a list shown in FIG. 18, wherein the list includes position information of marks in the X direction and the Y direction, which may be indicated as text information.

Further, in the above described example embodiment, as shown in FIGS. 7B/7C and FIGS. 12A/12B, a plurality of density-changed defect patterns and width-changed defect patterns are arranged and displayed on the screen with a given order corresponding to color and levels of artificial defects set for each mark, with which a user can easily select an allowable defect in view of the level of artificial defects. Further, a plurality of density-changed defect patterns and a plurality of width-changed defect patterns can be arranged and displayed on the screen randomly for color and levels of artificial defects (i.e., not arranged with a given order), in which a user can select marks without preconception.

Further, as explained with reference to FIGS. 7B and 7C, in an example embodiment, the density-changed defect patterns and the width-changed defect patterns can be reproduced using a plurality of artificial defects having different levels for each of cyan, magenta, yellow and black (CMYK). Because of human perception on colors may differ for each person, the level of artificial defects that can be allowed or cannot be allowed for each one of colors may be different for each person.

For example, as for a relatively pale color such as Y, one user may allow a mark corresponding to $PY+d_4$ shown in FIG. 8 (i.e., only a mark corresponding to $PY+d_5$ is selected as to-be-determined defect) while the same user may select marks corresponding to from $PK+d_1$ to $PK+d_5$ (i.e., all of marks shown in FIG. 8) as the to-be-determined defect for K. In this case, a threshold set for the mark corresponding to $PK+d_1$ becomes the strictest value. If this strictest value is applied, the defect of Y that the user determines as allowable may be determined as defect.

In this case, the inspection unit 404 can set thresholds step-wisely to enhance the user's convenience. Specifically, the finally set threshold may include a first threshold and a second threshold, in which the first threshold is set to determine defect without a confirmation of a user, and the second threshold is set to determine defect based on a selection of a user.

In this case, at S605 (FIG. 6), the threshold determination processing unit 403c extracts the strictest value as a threshold corresponding to the selected mark for each artificial defect of each of colors, that is for each of rows in the table shown in FIG. 9. Then, among the thresholds extracted for each of colors, the threshold determination processing unit 403c sets a value having a broadest allowable range as the first threshold, with which a smaller number of defects are determined as defect, and sets the strictest value as the second threshold, with which a greater number of defects are determined as defect.

In this processing, if a defect is determined as defect even if the threshold having the broadest allowable range is applied, a user may detect the same defect as defect by visual confirmation with a higher probability, therefore the defect is determined as defect without the confirmation by the user. Further, if a defect is determined as defect when the threshold having the narrowest allowable range is used, it is not clear whether the user may detect the same defect as defect by visual confirmation, therefore the defect is determined as defect based on the confirmation by the user, with which the defect determination precision can be enhanced.

Further, when the setting of threshold is conducted repeatedly as explained with reference for S607 (FIG. 6), the threshold determination processing unit 403c can designate the values of $d_n$ such as $d_m$ and $d_M$ of $d_n$ as the values corresponding to the first threshold and the second thresholds.

Further, in the above described example embodiment, as explained with reference to FIGS. 12A/12B and S605 (FIG. 6), a mark is selected upon the visual confirmation of artificial defects by the user, with which the inspection apparatus 4 can determine the finally-set threshold based on the threshold corresponding to the selected mark. With this configuration, the allowable level of defect determination can be set easily based on the user's visual confirmation.

Further, in the above example embodiment, as shown in FIG. 1, the DFE 1, the engine controller 2, the print engine 3 and the inspection apparatus 4 are separate apparatuses with each other. The DFE 1, the engine controller 2 and the print engine 3 shown in FIG. 1 can be included in image forming apparatuses such as printers, which are not image forming apparatuses for commercial printing machines such as production printers.

For example, as shown in FIG. 19A, the inspection apparatus 4 can be connected to a printer having the DFE 1, the engine controller 2 and the print engine 3. Further, as shown in FIG. 19B, a printer having the DFE 1, the engine controller 2, the print engine 3 and the inspection apparatus 4 can be configured as one printer.

Further, in the above example embodiment, the DFE 1, the engine controller 2, the print engine 3 and the inspection apparatus 4 are connected with each other via a local interface such as universal serial bus (USB), peripheral component interconnect express (PCIe) or the like to configure the system. However, the inspection apparatus 4 is not required to be placed at the same site of the DFE 1, the engine controller 2 and the print engine 3, but the inspection apparatus 4 can be provided as an application for the system, for example, via a network.

Figure 20:
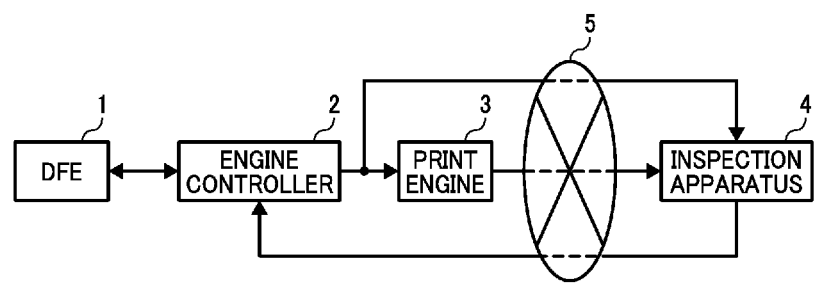
FIG. 20 shows a schematic configuration of a system according to another example embodiment.

FIG. 20 shows one example configuration that the function of the inspection apparatus 4 is provided via the network, in which the engine controller 2 and the print engine 3 may be connected to the inspection apparatus 4 via a public line 5 such as the Internet. The engine controller 2 and the print engine 3 can transmit information to the inspection apparatus 4 via the public line 5. Further, the inspection apparatus 4 can transmit an inspection result to the engine controller 2 via the public line 5. In this configuration, the inspection apparatus 4 is not required at a user site, with which an initial cost of the user can be reduced.

Further, in the configuration shown in FIG. 20, the user cannot control the inspection apparatus 4 directly because the function of the inspection apparatus 4 is provided via the network. In this configuration, the screens shown in FIGS. 12A/12B and FIG. 13 and other screens for controlling the inspection apparatus 4 can be displayed on an information processing apparatus such as a personal computer (PC) connectable to the network via a web browser, with which the user can use the system similar to the above example embodiment.

Further, in the above example embodiment, the first image, the second image and the third image are formed on different sheets, but not limited hereto. For example, the first image, the second image, and the third image can be formed on the same sheet, in which the master image processing unit 402 generates a master image by extracting an area displaying the first image, and further, the scanned image obtainer 401 extracts an area displaying the second image and the third image from the scanned image, and uses the extracted area as the scanned image data for the inspection target.

Further, in the above example embodiment, the levels of artificial defect can be changed by changing the defect density and/or defect range (e.g., width of defect), but not limited thereto. For example, other parameters of image can be used and changed as required. Further, in the above example embodiment, each parameter can be changed separately, but parameters can be changed with some combinations.

Further, in the above described example embodiment, the calibration process is conducted by printing a sheet displaying only the calibration-use image shown in FIG. 13 but not limited hereto. For example, the calibration-use image and other image scanned for other process can be formed on the same sheet. For example, a calibration processing for an optical sensor converting optical information to electrical signals may be conducted for adjustment of the scanner 302 to scan document effectively.

The calibration processing for the optical sensor is a process to match document color, which is a scan target, and image color generated by scanning the document color. For example, a measurement pattern is printed on a print sheet, and a scan result of the pattern and separately prepared reference value are compared to adjust scan properties of the optical sensor. Therefore, as shown in FIG. 21, the above described calibration-use image and the measurement pattern for calibration processing of the optical sensor can be printed on the same sheet.

Figure 21:
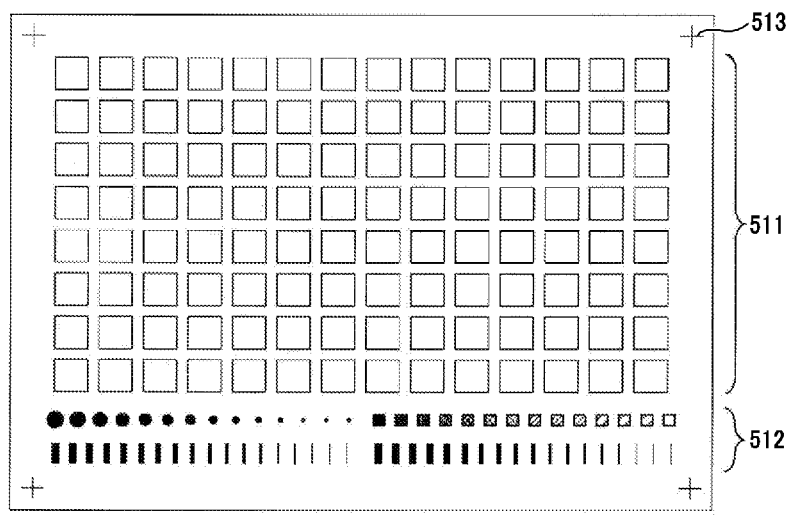
FIG. 21 shows an example image displaying a measurement pattern for calibration processing of an optical sensor and calibration-use image according to another example embodiment.

FIG. 21 shows a sheet displaying images (hereinafter, multi-adjustment image) including, for example, a measurement pattern 511 for calibration processing of the optical sensor, and the calibration-use image 512. As shown in FIG. 21, the multi-adjustment image displays the measurement pattern 511 for the calibration processing of the optical sensor, the calibration-use image 512, and a positioning mark 513 for positioning a sheet.

The measurement pattern 511 for the calibration processing of the optical sensor is an image arranging color patches having various colors and various densities, and the calibration processing of the optical sensor is conducted based on a scan result of each color patch and stored-density information for each color patch (hereinafter, color patch information). Therefore, similar to the above described calibration-use information, the color patch information correlates coordinate information indicating a position on the sheet and information indicating density of each color patch.

When the calibration pattern for the optical sensor and the calibration-use image are printed on the same sheet, an image forming operation can be conducted one time and a scanning operation can be conducted one time, with which an adjustment time required for the apparatus can be shortened. Further, when the calibration pattern for the optical sensor and the calibration-use image are printed on the same sheet, the calibration processing of the optical sensor is preferably conducted at first and then the calibration process using the calibration-use image is conducted, with which the calibration effect can be enhanced.

Further, the calibration-use image of FIG. 13 may be preferably disposed with a positioning mark such as the positioning mark 513 shown in FIG. 21, and the calibration process using the calibration-use image is preferably conducted after conducting the positioning, with which deviation between coordinate information of calibration-use information (FIG. 14) and coordinate information of the scanned image can be reduced, in particular prevented, with which a preferable calibration effect can be obtained.

Further, in the above example embodiment, when the threshold determination process is conducted, the modules used for the normal inspection process such as the master image processing unit 402, the inspection unit 404 or the like can be controlled by the master image generation controller 403a and the image comparison inspection controller 403b, and the threshold determination processing unit 403c and the UI controller 403d can be operated based on information obtained by the control, with which the modules can be collectively functioned as a threshold determiner.

Similarly, when the defect range determination process is conducted under the control of the range determination controller 403e, the modules used for the normal inspection process such as the master image processing unit 402, the inspection unit 404 or the like can be controlled by the range determination controller 403e, with which theses modules can be collectively functioned as a defect range determiner.

With this configuration, the configuration of apparatus can be simplified by using each module effectively. Further, because the same or similar modules used for the normal inspection process can be used for the threshold determination process and the defect range determination process, these process can be conducted effectively, but the configuration is not limited hereto. For example, a master image generation module and an image comparison inspection module specifically employed for the threshold determination process and the defect range determination process can be provided.

In this case, an inspection reference image generation unit that generates an inspection reference image having a normal image condition to be used for determining a given threshold for the image inspection, and an image comparison inspection unit that computes a difference between the scanned image of the threshold setting image and the inspection reference image can be provided.

Further, in the above example embodiment, the threshold determination processing unit 403c and the UI controller 403d are configured in the inspection control unit 403, but the configuration is not limited hereto. For example, a specific module for the threshold determination processing unit 403c and a specific module for the UI controller 403d can be provided separately from the inspection control unit 403.

Further, in the above example embodiment, one module such as the range determination controller 403e controls the process of S1502 to S1505 of FIG. 15, but the configuration is not limited hereto. For example, each of S1502 to S1505 can be conducted using different modules or some of the process of S1502 to S1505 can be collectively controlled by one module, in which the modules can collectively function as the defect range determiner.

In the above example embodiment, an image inspection is conducted by comparing an image obtained by scanning an image output by an image forming operation and a master image, and the setting of thresholds used for determining defect can be conducted easily and preferably based on a comparison result of images.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore also understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image inspection apparatus for inspecting an image output on a recording medium by scanning the output image as a scanned image, the image inspection apparatus comprising:
    an inspection reference image generator to obtain data of an output-target image used by the image forming apparatus for an image fomiing operation, and to generate an inspection reference image using the data of the output-target image, the inspection reference image to be used for an image inspection of the scanned image;
    an image inspection unit to determine whether the scanned image includes a defect based on a comparison result obtained by comparing a difference between the inspection reference image and the scanned image with a given threshold;
    a threshold determiner to determine the given threshold based on a comparison result between the inspection reference image having a normal image condition and the scanned image of threshold setting image prepared by adding a plurality of artificial defects having different defect levels to the inspection reference image; and
    a defect range determiner to determine a range of defect level of a plurality of artificial defects having the different levels for the threshold setting image;
    wherein the threshold determiner controls generation of the inspection reference image having the normal image condition to be used for determining the given threshold,
    wherein the threshold determiner computes a difference between the inspection reference image and the scanned image of the threshold setting image for each of the plurality of artificial defects having the different defect levels,
    wherein, based on a difference computed for a defect selected from the plurality of artificial defects having different defect levels, the threshold determiner determines a threshold to be compared with the difference of the selected defect to determine whether the scanned image includes a defect;
    wherein the defect range determiner conducts a defect determination process for a range determination scanned image, obtained by scanning a range determination image displaying a plurality of defects having changed levels with a given interval at each of the upper limit and the lower limit settable for a threshold,
    wherein the defect range determiner determines a range of defect level of the plurality of artificial defects having the different defect levels for the threshold setting image based on a defect level of a defect determined as defect in the defect determination process for the range determination image at each of the upper limit and the lower limit settable for the threshold.

2. The image inspection apparatus of claim 1, wherein the range determination scanned image is divided into a plurality of area as divided areas, and the defect range determiner determines a defect for each of the divided areas of the range determination scanned image,
    wherein the defect range determiner refers to information of position displaying each of the plurality of defects in the range determination image, and determines a range of defect level of the plurality of artificial defects having different defect levels for the threshold setting image based on a level of defect corresponding to a position of the divided area determined as defect in the range determination scanned image.

3. The image inspection apparatus of claim 1, wherein the threshold setting image is prepared by adding a plurality of artificial defects having different levels for different types of defect to the reference inspection image,
wherein the range determination image includes images displaying a plurality of defects by changing levels for the different types of defect with a given interval,
wherein the defect range determiner determines a defect range for a plurality of artificial defects having different levels for each of the different types of defect prepared as the threshold setting image based on a level of defect determined as defect for each of the different types of defect in a defect determination process at each of the upper limit and the lower limit settable for the threshold.

4. The image inspection apparatus of claim 1, wherein the threshold determiner outputs display information for displaying a selection screen for selecting a defect from the plurality of artificial defects having different defect levels, and recognizes a defect selected by an operation to the selection screen.

5. The image inspection apparatus of claim 4, wherein the threshold determiner outputs display information for displaying a selection screen randomly arranging the plurality of artificial defects having different defect levels in view of the defect levels of the artificial defects.

6. The image inspection apparatus of claim 1, wherein when the inspection reference image is generated, the inspection reference image generator functions as a part of the threshold detelininer,
wherein when the difference between the reference inspection image and the scanned image is computed, the image inspection unit functions as a part of the threshold determiner,
wherein when the defect determination process is conducted for the range determination scanned image at each of the upper limit and the lower limit settable for a threshold, the image inspection unit functions as a part of the defect range determiner.

7. An image inspection system for inspecting an image output on a recording medium, the image inspection system comprising:
an image forming unit to conduct an image forming operation of a threshold setting image on the recording medium, the threshold setting image prepare-able by adding an artificial defect to an output-target image input to the image forming unit;
an image scanner to scan the threshold setting image output on the recording medium to generate a scanned image;
an inspection reference image generator to obtain data of the output-target image used by the image forming apparatus for an image forming operation, and to generate an inspection reference image using the data of the output-target image, the inspection reference image to be used for an image inspection of the scanned image;
an image inspection unit to determine whether the scanned image includes a defect based on a comparison result obtained by comparing a difference between the inspection reference image and the scanned image with a given threshold;
a threshold determiner to determine the given threshold based on a comparison result between the inspection reference image having a normal image condition and the scanned image of threshold setting image prepared by adding a plurality of artificial defects having different defect levels to the inspection reference image; and a defect range determiner to determine a range of defect level of a plurality of artificial defects having the different levels for the threshold setting image,
wherein the image forming section unit conducts an image forming operation of the threshold setting image based on the determined range of defect level of the artificial defect,
wherein the threshold determiner controls generation of the inspection reference image having the normal image condition to be used for determining the given threshold,
wherein the threshold determiner computes a difference between the inspection reference image and the scanned image of the threshold setting image for each of the plurality of artificial defects having the different defect levels,
wherein, based on a difference computed for a defect selected from the plurality of artificial defects having different defect levels, the threshold determiner determines a threshold to be compared with the difference of the selected defect to determine whether the scanned image includes a defect;
wherein the defect range determiner conducts a defect determination process for a range determination scanned image, obtained by scanning a range determination image displaying a plurality of defects having changed levels with a given interval at each of the upper limit and the lower limit settable for a threshold,
wherein the defect range determiner determines a range of defect level of the plurality of artificial defects having the different defect levels for the threshold setting image based on a defect level of a defect determined as defect in the defect determination process for the range determination image at each of the upper limit and the lower limit settable for the threshold.

8. A method of inspecting an image, output on a recording medium, using an image inspection apparatus, the method comprising the steps of:
obtaining an output-target image input to an image fonning apparatus;
generating an inspection reference image using data of the output-target image;
forming a threshold setting image on the recording medium using the image forming apparatus, the threshold setting image prepare-able by adding an artificial defect to the inspection reference image;
scanning the threshold setting image formed on the recording medium to obtain a scanned image of the threshold setting image;
computing a difference between the scanned image and the inspection reference image by comparing the scanned image and the inspection reference image;
determining a threshold, based on a difference computed for a defect selected from the plurality of artificial defects having different defect levels, the determined threshold to be compared with the difference for the selected defect to determine whether the scanned image includes a defect;
conducting a defect determination process for a range determination scanned image obtained by scanning a range determination image, displaying a plurality of defects by changing levels of different types of defect with a given interval, at each of the upper limit and the lower limit settable for a threshold; and
determining a range of defect level of the plurality of artificial defects having the different defect levels for the threshold setting image based on levels of defect determined as defect in the defect determination process for the range deteimination image at each of the upper limit and the lower limit settable for the threshold.

* * * * *